United States Patent
Susi, III et al.

(10) Patent No.: US 8,156,432 B2
(45) Date of Patent: Apr. 10, 2012

(54) DETECTION OF UTF-16 ENCODING IN STREAMING XML DATA WITHOUT A BYTE-ORDER MARK AND RELATED PRINTERS, SYSTEMS, METHODS, AND COMPUTER PROGRAM PRODUCTS

(75) Inventors: Ferdinand C. Susi, III, McHenry, IL (US); Jessica S. Wettstein, Hainesville, IL (US)

(73) Assignee: ZIH Corp. (BM)

( * ) Notice: Subject to any disclaimer, the term of this patent is extended or adjusted under 35 U.S.C. 154(b) by 973 days.

(21) Appl. No.: 12/047,057

(22) Filed: Mar. 12, 2008

(65) Prior Publication Data

US 2009/0125537 A1 May 14, 2009

Related U.S. Application Data

(60) Provisional application No. 60/987,890, filed on Nov. 14, 2007, provisional application No. 60/988,592, filed on Nov. 16, 2007.

(51) Int. Cl.
*G06F 17/00* (2006.01)
*H03N 7/00* (2006.01)

(52) U.S. Cl. .......... 715/274; 715/205; 715/234; 341/50; 341/95; 358/1.1; 358/539

(58) Field of Classification Search .......... 715/200–205, 715/234, 243, 249, 255, 256, 273, 274, 760, 715/210, 253, 700; 341/50, 51, 52, 53, 54, 341/56, 58, 61, 62, 73, 74, 78, 84, 85, 90, 341/95; 358/1.1, 1.2, 1.4, 1.9, 2.1, 3.1, 3.12, 358/3.23, 526, 539

See application file for complete search history.

(56) References Cited

U.S. PATENT DOCUMENTS

| | | | |
|---|---|---|---|
| 6,540,142 B1 | 4/2003 | Alleshouse | |
| 6,568,596 B1 * | 5/2003 | Shaw | 235/462.01 |
| 6,655,593 B2 | 12/2003 | Alleshouse | |
| 6,908,034 B2 | 6/2005 | Alleshouse | |
| 7,025,268 B2 | 4/2006 | Alleshouse | |
| 7,172,122 B2 | 2/2007 | Alleshouse | |
| 7,356,764 B2 * | 4/2008 | Radja et al. | 715/234 |
| 7,400,271 B2 * | 7/2008 | Cameron | 341/50 |
| 7,407,102 B2 * | 8/2008 | Alleshouse | 235/462.01 |
| 7,600,685 B2 * | 10/2009 | Alleshouse | 235/462.01 |
| 2003/0058469 A1 * | 3/2003 | Buis et al. | 715/513 |
| 2003/0097462 A1 * | 5/2003 | Parent et al. | 709/236 |
| 2003/0136841 A1 * | 7/2003 | Alleshouse | 235/462.01 |
| 2004/0094632 A1 * | 5/2004 | Alleshouse | 235/494 |

(Continued)

OTHER PUBLICATIONS

UTF-16/UCS-2, available at http://en.wikipedia.org/wiki/UTF-16, dated Feb. 2, 2009, 5 pages.

(Continued)

*Primary Examiner* — Maikhanh Nguyen
(74) *Attorney, Agent, or Firm* — Alston & Bird LLP

(57) ABSTRACT

Provided are printers and other electronic devices, systems, methods, and computer program products that automatically detect and determine UTF-16 encoding schemes and endiannesss thereof in an incoming XML data steam for XML declarations without a UTF-16 byte-order mark (BOM) or encoding declaration. This allows for the automatic and unambiguous accurate detection of UTF-16 encoded XML data within a mixed encoding environment, such as from multiple sources using more than one encoding scheme, even when XML data does not start with a BOM or encoding declaration.

15 Claims, 3 Drawing Sheets

U.S. PATENT DOCUMENTS

| | | | |
|---|---|---|---|
| 2005/0278616 A1* | 12/2005 | Eller | 715/513 |
| 2006/0138227 A1 | 6/2006 | Alleshouse | |
| 2006/0249566 A1 | 11/2006 | Alleshouse | |
| 2007/0125859 A1 | 6/2007 | Alleshouse | |
| 2007/0176802 A1 | 8/2007 | Fay et al. | |
| 2008/0030771 A1 | 2/2008 | Alleshouse | |

OTHER PUBLICATIONS

Byte-Order Mark, available at http://en.wikipedia.org/wiki/Byte_Order_Mark, dated Feb. 2, 2009, 3 pages.

Unicode Character 'Less-Than Sign' (U+003C), FileFormat.Info, available at http://www.fileformat.info/info/unicode/char/003c/index.htm, dated Feb. 2, 2009, 3 pages.

Character Encoding Detection, available at http://mailman.ic.ac.uk/pipermail/xml-dev/1998-May/003666.html, dated Feb. 2, 2009, 3 pages.

Re: Encoding detection again . . . , available at http://lists.xml.org/archives/xml-dev/199903/msg00044.html, datd Feb. 2, 2009, 2 pages.

Mined 2000—Powerful text editor with extensive Unicode and CJK support, Introduction to mined, available at http://towo.net/mined/overview.html, dated Feb. 2, 2009, 3 pages.

Unicode Text Editor Mined 2000 Release 13.1, available at http://mail.nl.linux.org/linux-utf8/2006-10/msg00005.html, dated Feb. 2, 2009, 4 pages.

HTML-5, Call for Comments—Oct. 27, 2007, available at http://www.whatwg.org/specs/web-apps/2007-10-26/multipage/section-parsing.html, dated Feb. 2, 2009, 10 pages.

http://mail-archives.apache.org/mod_mbox/xerces-commits/2000004.mbox/raw/<20000406073635.7772.qmail@locus.apa.che.org>, (dated Oct. 31, 2007, 26 pages.

Appendix F. Autodetection of Character Encoding Normative), available at http://safari.oreilly.com/0130826766/app06, dated Oct. 31, 2007, 4 pages.

Extensible Markup Language (XML) 12.1 (Second Edition), available at http://www.w3.org/TR/xml11/, dated Nov. 4, 2007, 56 pages.

Endianness, available at http://en.wikipedia.org/wiki/Endianness, dated Oct. 31, 2007, 6 pages.

UTF-16 Files and the Byte Order Mark (BOM), available at http://www.firstobject.com/dn_markutfl6bom.htm, available at Oct. 31, 2007, 2 pages.

Tucu's Weblog, available at http://blogs.sun.com/tucu/date/20040910, dated Oct. 31, 2007, 3 pages.

The Skew.org XML Tutorial, available at http://skew.org/xml/tutorial/, dated Oct. 31, 2007, 19 pages.

Unicode, available at http://en.wikipedia.org/wiki/Unicode, dated Oct. 31, 2007, 11 pages.

Lovis, M. V., *Data-Centric XML* (*Character Sets*; Nov. 7, 2007, available at http://www.dcl.hpi.uni-potsdam.de/teaching/xm107/xm14.pdf, 20 pages.

Lovis, M. V., *Datenorientiertes XML*; Nov. 7, 2007, available at http://www.dcl.uni-potsdam.de/teaching/xm107/, 3 pages.

Prescot, P., *Recipe 52257: Auto-detect XML encoding*, Mar. 14, 2001, available at http://code.activestate.com/recipes/52257/, 2 pages.

* cited by examiner

DETECTION OF UTF-16 ENCODING IN STREAMING XML DATA WITHOUT A BYTE-ORDER MARK AND RELATED PRINTERS, SYSTEMS, METHODS, AND COMPUTER PROGRAM PRODUCTS

CROSS-REFERENCE TO RELATED APPLICATIONS

This application claims priority to and the benefit of the filing dates of U.S. patent application Ser. No. 60/987,890, entitled "Detection of UTF-16 Encoding in Streaming XML Data Without a Byte-Order Mark and Related Printers, Systems, Methods, and Computer Program Products," filed Nov. 14, 2007, and U.S. patent application Ser. No. 60/988,592, entitled "Detection of UTF-16 Encoding in Streaming XML Data Without a Byte-Order Mark and Related Printers, Systems, Methods, and Computer Program Products," filed Nov. 16, 2007, the contents of which are incorporated by reference in their entireties.

FIELD OF THE INVENTION

Embodiments of the present invention relate generally to data encoding and decoding and, more particularly, to a printer or other electronic device receiving an incoming data steam and automatically detecting and determining a UTF-16 encoding scheme, including the endianness of the UTF-16 encoding scheme, for an XML declaration in an incoming XML data stream without a byte-order mark (BOM), and related systems, methods, and computer program products.

BACKGROUND

Extensible Markup Language (XML) has become a readily used and widely accepted general-purpose markup language. XML is an open standard that has been adopted by many business and non-business entities for use in a variety of applications. One notable use of XML is for the sharing of structured data across different information systems, such as via the Internet and the World Wide Web (WWW). Greater detail concerning XML may be found at www.w3.org/XML; in the XML 1.0 standard specification, *Extensible Markup Language (XML)*1.0 (*Fourth Edition*), W3C Recommendation 16 Aug. 2006, edited by Tim Bray, Jean Paoli, C. M. Sperberg-McQueen, Eve Maler, and François Yergeau (available at www.w3.org/TR/xml/); and in the XML 1.1 standard specification, *Extensible Markup Language (XML)* 1.1 (*Second Edition*), W3C Recommendation 16 Aug. 2006, edited by Tim Bray, Jean Paoli, C. M. Sperberg-McQueen, Eve Maler, François Yergeau, and John Cowan (available at www.w3.org/TR/xml11/), the content of each of which is hereby incorporated by reference in its entirety, including for purposes of more fully describing the standard form and use of XML and requirements for well-formed XML and valid XML.

Like computers and other computing devices and systems, printers and printing systems may also use XML data, and notably rather than a proprietary data format and/or a proprietary or fixed single data encoding scheme. Printing systems, such as for printing barcodes and for transmitting data to a barcode printer, are widely used. And while many such printing systems and printers use proprietary data formats and/or proprietary methods of data encoding and may not be interchangeable and/or compatible with other printing systems and barcode printers, some beneficial printers and printing systems have been developed that use the XML data format and readily acceptable data encoding formats, such as XML data encoded according to UTF-8.

The XML standard specification allows for XML data to be stored using multiple character encoding schemes, including but not limited to ISO-8859-1, Extended Unix Code for Korean text (EUC-KR), UTF-8, and UTF-16. And the XML standard specification requires that processors of XML support the Unicode character encodings UTF-8 and UTF-16. Use of more limited encodings, such as those based on ISO/IEC 8859 and UTF-32, is acknowledged and is widely used and supported, but is not a mandatory requirement of XML specifications. In XML, attributes (also referred to as elements and pseudo-attributes) in a declaration may optionally be included, such as an XML declaration that states what version of XML is being used. An XML declaration may also contain information about character encoding (also referred to as an encoding declaration). For example, an XML script may begin with the XML declaration <?xml version="1.0" encoding="UTF-8"?>, indicating that XML version 1.0 is being used and that the encoding is UTF-8. Thus, the primary method used by computing devices and systems, including printers, to accurately detect the encoding used in XML data and thereby decode the XML data is to examine the encoding attribute in the XML declaration at the start of the XML data stream, such as <?xml encoding="UTF-8"?>.

However, this is a problem for UTF-16, which is a non-ASCII transparent byte serialized encoding scheme that may be either big-endian (BE) or little-endian (LE) and, thus, define the order of the bytes in the encoding scheme. Computing devices and systems are not able to decode the encoding attribute for UTF-16 if it is encoded as UTF-16 unless the computing device or system first knows that the incoming XML data is encoded in UTF-16. This presents a logical Catch-22. To resolve the potential problem, the XML standard specification requires that any XML data encoded in UTF-16 must be prefaced with a valid Unicode UTF-16 byte-order mark (BOM) described in ISO/IEC 10646 or Unicode with a Zero Width No-Break Space character, xFEFF also called a Byte Order Mark (byte sequence FE FF in UTF-16BE and byte sequence FF FE in UTF-16LE). Greater detail concerning character encoding in XML may be found, for example, in Section 4.3.3, entitled *Character Encoding in Entities*, in *Extensible Markup Language (XML)* 1.1 (*Second Edition*) and in Sections 2.5 and 2.6 entitled *Encoding Forms* and *Encoding Schemes* in *The Unicode Standard, Version* 5.0.

Furthermore, the Unicode standard itself states that the use of a BOM is optional. This presents another problem for the use of UTF-16 and XML. For example, many utilities that are used to create XML data are Unicode compliant, but are not necessarily written specifically for XML, and may, therefore, be valid but not well-formed XML. And, as a result, UTF-16 XML data may not be preceded by the required BOM. The XML standard specification provides that it is a fatal error for an entity which begins with neither a Byte Order Mark nor an encoding declaration to use an encoding other than UTF-8.

This problem is exacerbated when a computing device or system must interpret an incoming data stream of XML data, such as from multiple hosts/sources, each which may be using their own encoding scheme, rather than individual XML data files, a single host/source, or multiple hosts/sources using a single, known encoding scheme. For example, a computing device or system may not be able to detect the presence of the start of a new XML declaration and/or may not be able to determine the encoding scheme used for the subsequent XML data, particularly where XML data is encoded in UTF-16, but no BOM is provided.

A need exists for printers and other electronic devices, systems, methods, and computer program products that may receive an incoming data steam to unambiguously automatically detect and determine a UTF-16 encoding scheme and the endianness thereof for an XML declaration in the incoming XML data stream without a BOM.

SUMMARY

In light of the foregoing background, embodiments of the present invention provide printers and other electronic devices, systems, methods, and computer program products that may receive an incoming data steam and unambiguously automatically detect and determine a UTF-16 encoding scheme and the endianness thereof for an XML declaration in the incoming XML data stream without a BOM. As such, embodiments of the present invention allow for the automatic and unambiguous accurate detection of UTF-16 encoded XML data within a mixed encoding environment (e.g., from one or more sources using more than one encoding scheme) even when XML data does not start with a BOM. Embodiments of the present invention may be used in any XML and Unicode compliant printer. Embodiments of the present invention are also applicable for use in any electronic device or system that may receive XML or another structured markup language and Unicode data streamed from one or more sources using multiple encoding schemes into a single port for interpretation.

Embodiments of methods of the present invention are provided that automatically detect UTF-16 encoding in an incoming XML data stream without a BOM. An exemplary embodiment of the present invention is briefly described as follows. The embodiment of a method of the present invention includes receiving an incoming data stream and monitoring the incoming data stream for the presence of a 0x3C byte. The method may also store a current encoding status of the incoming data stream. When a 0x3C byte is identified, the embodiment determines if a byte following the 0x3C byte is a null 0x00 byte. If the byte following the 0x3C byte is a null 0x00 byte and if the current encoding status is not UTF-16LE, then the embodiment determines if a byte before the 0x3C byte is a null 0x00 byte. If the byte before the 0x3C byte is a null 0x00 byte, then the embodiment begins processing the incoming data stream as UTF-16BE and stores the current encoding status of the incoming data stream as UTF-16BE. If the byte before the 0x3C byte is not a null 0x00 byte, then the embodiment begins processing the incoming data stream as UTF-16LE and stores the current encoding status of the incoming data stream as UTF-16LE. And if the byte following the 0x3C byte is a null 0x00 byte and if the current encoding status is UTF-16LE, then the embodiment determines if the two bytes before the 0x3C byte are null 0x00 bytes. If the two bytes before the 0x3C byte are null 0x00 bytes, then the embodiment begins processing the incoming data stream as UTF-16BE and stores the current encoding status of the incoming data stream as UTF-16BE. If the two bytes before the 0x3C byte are not null 0x00 bytes, then the embodiment begins processing the incoming data stream as UTF-16LE and stores the current encoding status of the incoming data stream as UTF-16LE. If the byte following the 0x3C byte is not a null 0x00 byte, then the embodiment uses the XML encoding tag to determine the current encoding status of the incoming data stream from an encoding scheme identified in the XML encoding tag and begins processing the incoming data stream according to the encoding scheme identified in XML encoding tag. The method may also store the current encoding status of the incoming data stream as the encoding scheme identified in XML encoding tag.

These characteristics as well as additional features, functions, and details of the present invention are described below. Similarly, corresponding and additional embodiments of printers and other electronic devices and systems and related methods and computer program products of the present invention are also described below.

BRIEF DESCRIPTION OF THE DRAWINGS

Figure 1:
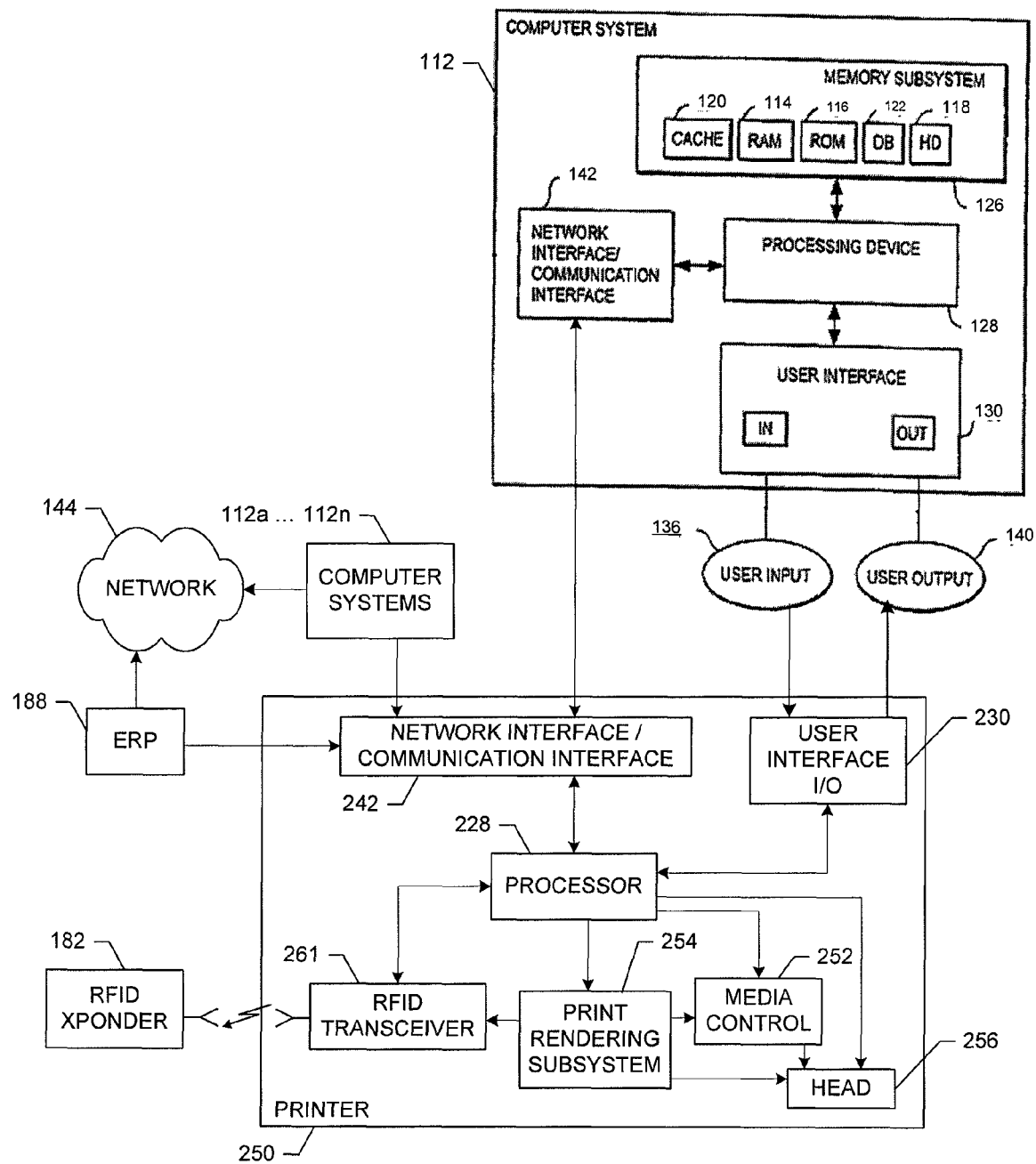
Figure 2:
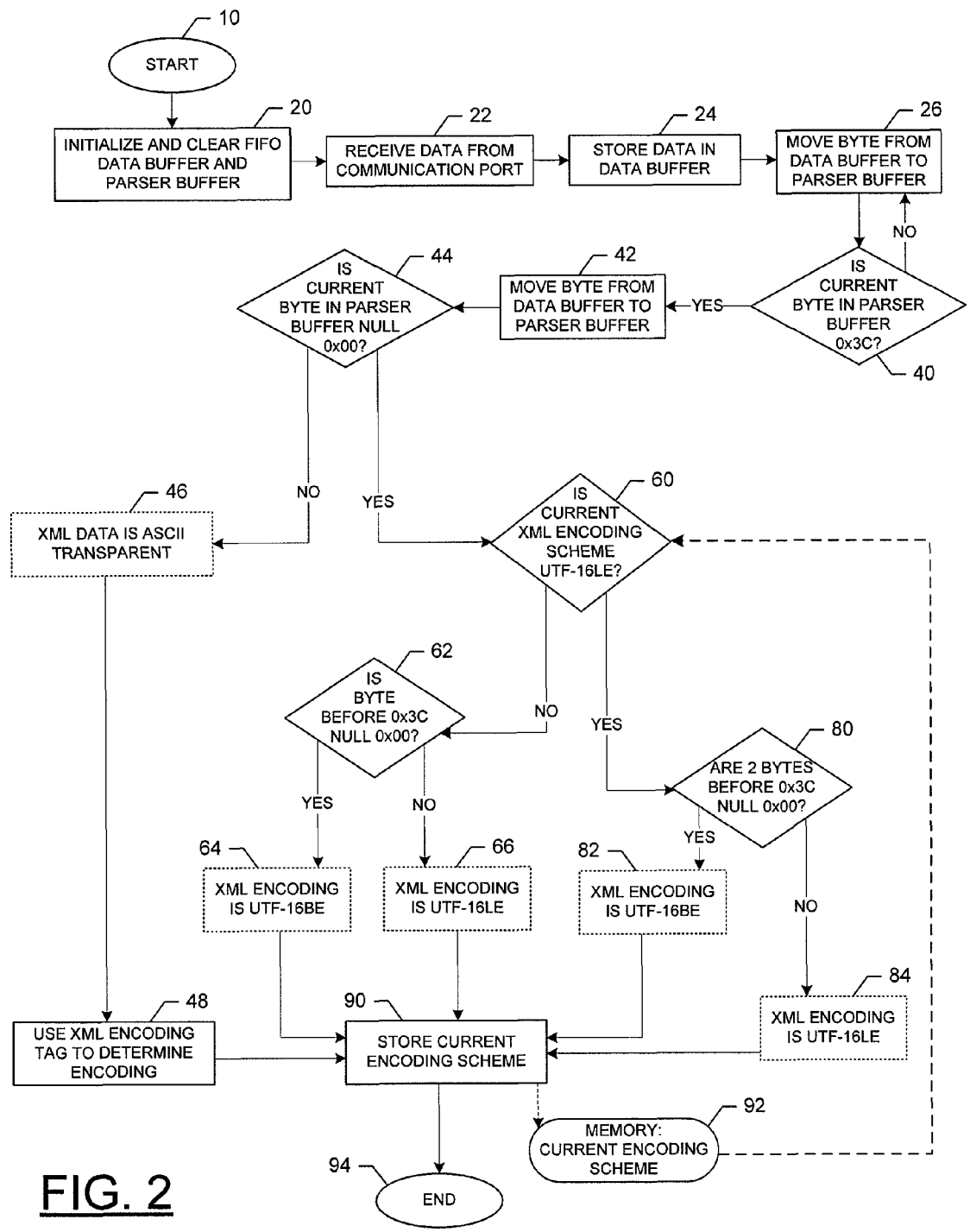
Figure 3:
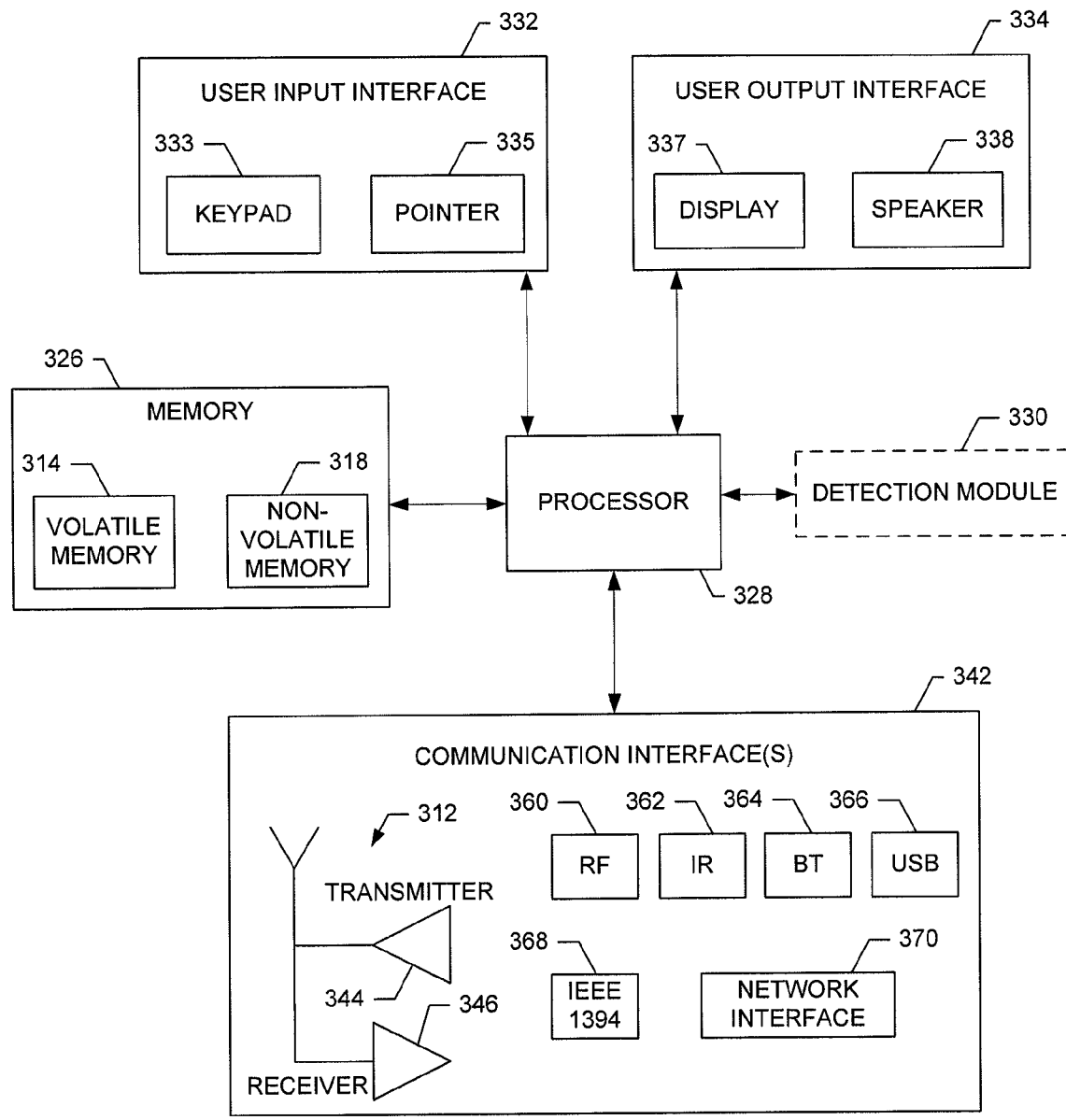

Having thus described embodiments of the invention in general terms, reference will now be made to the accompanying drawings, which are not necessarily drawn to scale, and wherein:

FIG. 1 is a schematic block diagram of a printing system according to an embodiment of the present invention;

FIG. 2 is a functional software flow diagram of a method of an embodiment of the present invention; and FIG. 3 is a schematic block diagram of an entity capable of operating as a printer or other computing device or system in accordance with an embodiment of the present invention.

DETAILED DESCRIPTION

Embodiments of the present invention will now be described more fully hereinafter with reference to the accompanying drawings, in which some, but not all embodiments of the invention are shown. Indeed, embodiments of the present invention may be embodied in many different forms and should not be construed as limited to the embodiments set forth herein; rather, these embodiments are provided so that this disclosure will satisfy applicable legal requirements. Like reference numbers refer to like elements throughout.

It will be appreciated from the following that many types of computing devices and systems may be used with the present invention, including, for example, computers, printers, print servers, Internet servers, routers, mobile telephones, mobile media devices, handheld data terminals, personal data assistants (PDAs), and other computing devices and systems. Embodiments of the present invention may be implemented by and/or with printers commercially available from Zebra Technologies Corporation of Vernon Hills, Ill., including the following printer models: XiIII+, 90XiIII+, 96XiIII+, 110XIII+, 140XiIII+, 170XiIII+, 220XiIII+, Model Z4M, Z6M, 105SL Model R4 Mplus, R402, R-140, and Model Xi series printers. Greater detail concerning those and like printers and corresponding printing systems may be found in U.S. Provisional Appl. Ser. No. 60/345,389, filed Jan. 4, 2002, entitled XML Printer Technology; U.S. Provisional Appl. Ser. No. 60/341,427, filed Dec. 17, 2001, entitled Bar Code Labeling Systems Having Machine Readable Standards; U.S. application Ser. No. 10/197,014, filed Jul. 17, 2002, entitled Native XML Printer, now U.S. Pat. No. 6,540,142; U.S. application Ser. No. 10/332,604, filed Jan. 10, 2003, entitled XML Printer System; U.S. application Ser. No. 11/351,748, filed Feb. 10, 2006, entitled XML Printer System; U.S. application Ser. No. 11/774,152, filed Jul. 6, 2007, entitled XML Printer System; U.S. application Ser. No. 10/348,422, filed Jan. 21, 2003; entitled Native XML Printer; U.S. application Ser. No. 10/601,213, filed Jun. 20, 2003, entitled XML System, now U.S. Pat. No. 6,908,034; U.S. application Ser. No. 11/010, 895, filed Dec. 13, 2004, entitled XML System, now U.S. Pat. No. 7,172,122; U.S. application Ser. No. 11/561,084, filed Nov. 17, 2006, entitled XML System; and U.S. application Ser. No. 10/505,982, filed Mar. 28, 2006, entitled XML Printer System with RFID Capability, U.S. Provisional Appl.

Ser. No. 60/761,610, filed Jan. 24, 2006, entitled Global Printing System and Method of Using Same; U.S. application Ser. No. 11/626,670, filed Jan. 24, 2007, entitled Global Printing System and Method of Using Same, the content of each of which is hereby incorporated by reference in its entirety, including for purposes of more fully describing the use and configuration of such printing systems and printers and use of XML and Unicode data thereby.

Further, while the present invention is described below with reference to wired direct and networked communications with a printer, the present invention is applicable to any form of wired and wireless access and communication protocols for establishing communications between any type and number of computing devices and systems, including, for example, WLAN, Bluetooth (BT), WiMAX, UWB, infrared (IR), and cellular wireless technologies and protocols, serial, parallel, and Ethernet wired technologies and protocols, and IEEE 1394 and USB direct connection technologies and protocols. Further, embodiments of the present invention may function with any type of co-located (coexistent or proximate) or distributed (remote) architecture. Computing devices need not be physically co-located. Similarly, embodiments of the present invention may use shared hardware (e.g., processor, memory, and power) or software (e.g., operating system, firmware, software print drivers, print rendering subsystems, and applications) or may use separate hardware, whether co-located or distributed.

It will be appreciated that embodiments of the present invention may be particularly useful for printing applications with multiple hosts and/or sources (collectively referred to herein as sources). However, embodiments of the present invention are not limited to such multi-source printing applications, but may be applied in any type of environment, including single- and multi-source environments, and for any type of application, including printing, Internet, file transfer, streaming multimedia, and other data transfer applications.

And further, while the present invention is described below with reference to XML data, the present invention may be implemented in like manner with respect to other structured markup languages and scripts, such as ZPL and HTML, with known starting identifiers, such how valid XML data must start with an XML declaration that begins with "<?xml", or at least known beginning tag statement start identifiers, such as how valid HTML tags begin with "<".

The terms ASCII transparent and ASCII transparency are terms used herein that refer to an encoding scheme property in which the bytes used to represent the first 128 characters are the same as in the ASCII standard. Examples of ASCII transparent encoding schemes are ASCII, GB2312, and UTF-8.

Embodiments of the present invention provide printers and other electronic devices, systems, methods, and computer program products of embodiments of the present invention that automatically detect and determine UTF-16 encoding schemes and endiannesss thereof in an incoming XML data steam for XML declarations without a UTF-16 byte-order mark (BOM) or encoding declaration. This allows for the automatic and unambiguous accurate detection of UTF-16 encoded XML data within a mixed encoding environment, such as from multiple sources using more than one encoding scheme, even when XML data does not start with a BOM or encoding declaration. This also allows for support of legacy devices and systems that use different Unicode and proprietary encoding schemes and devices and systems that are not XML compliant, i.e., such as devices and systems that are not configured to include a BOM for UTF-16 encoded XML data.

Referring now to FIG. 1, an exemplary embodiment of a high-level schematic block diagram of a printer 250 according to an embodiment of the present invention is shown in communication with various additional devices, including a computer system 112. The printer 250 is connect to the computer system 112, which itself includes various hardware components, such as RAM 114, ROM 116, hard disk storage 118, cache memory 120, database storage 122, and the like (referred to collectively as storage or memory, and depicted as a storage or memory subsystem 126), as is known in the art. The printer 250 and computer system 112 combination may collectively be referred to as a printing system. The printer 250 and computer system 112 may be combined in a common enclosure (coexistent), but need not necessarily be constructed in this manner. For example, the computer system 112 may be housed in an enclosure separate and apart from the printer 250, such that the two devices are proximately co-located. The combination printing system may not be recognized as two separate devices and/or may be considered a single device, and thus, referred to individually as a printer or printing system. When housed in separate enclosures, whether proximate or remote from each other, the two devices may be referred to separately as a printer and a computer. Further, when the printer 250 comprises all necessary hardware and firmware and is configured to operate independently of any particular computer system 112, 112a...112n or other device (e.g., ERP 188), the computer system 112 is like any other host or source of data for the printer, such as computer systems 112a...112n and ERP 188. The relationship of such devices is not particular to embodiments of the present invention.

The computer system 112 may include any suitable processing device 128, such as a computer, microprocessor, RISC processor (reduced instruction set computer), CISC processor (complex instruction set computer), mainframe computer, work station, single-chip computer, distributed processor, server, controller, micro-controller, discrete logic computer, or like processor, as are known in the art. For example, the processing device 128 may be an Intel Core™ or Pentium® microprocessor, other x86 compatible microprocessor, or equivalent processing device.

The memory subsystem 126 may include any suitable storage components, such as RAM 114, ROM 116, EPROM (electrically programmable ROM), flash memory, dynamic memory, static memory, FIFO (first-in first-out) memory, LIFO (last-in first-out) memory, circular memory, semiconductor memory, bubble memory, buffer memory, hard disk memory 118, optical memory, cache memory 120, database memory 122, and the like, as are known in the art. Any suitable form of memory or storage or memory subsystem 126 may be used whether fixed storage on a magnetic medium, storage in a semiconductor device, or remote storage accessible through a communication link.

A user interface 130 may be included in or coupled to the computer system 112 and may include various user input devices 136, such as buttons or switches selectable by the user, a keyboard, a mouse, a touch screen, bar code scanner, RFID reader (or reader/writer), or like user input devices, as are known in the art. The user interface 130 also may include one or more suitable user output devices 140, such as an LCD display, a CRT, various LED indicators, a speech output device, and like data output presentation devices, as are known in the art.

To communicate between the computer system 112 and external sources, a communication interface 142 may be operatively included in or coupled to the computer system 112. The communication interface 142 may be, for example, as shown for computer system 112, an interface for a direct connection to a printer 250 or, as shown for computer systems 112a . . . 112n, an interface for a connection to a local area network, an Ethernet network, an intranet, or other suitable network 144. A communication interface may also be connected to a public switched telephone network (PSTN) or POTS (plain old telephone system), which may facilitate communication with a network 144 or direct connection to a printer 250. Dedicated and remote networks may also be employed. Any suitable commercially available communication device or network may be used, as is known in the art.

As described above, a computer system 112, 112a . . . 112n may be coupled to a printer 250. A printer 250 may be an XML printer for which the native or natural "language" of the system is XML and, thus, referred to as a "native XML printer." The printer 250 includes a processor 228, and may also include additional computing hardware shown and described more fully with respect to the computing system 112 and the entity of FIG. 3. The printer 250 may include a media/paper control system 252, a print rendering subsystem 254 (such as including a print driver or print rendering driver, not to be confused with a software print driver), and a print head mechanism 256. Any suitable printer capable of printing barcode labels may be used, which may include various dot matrix, ink jet, laser and/or thermal printers. Such suitable printers, for example, are available from Zebra Technologies Corporation of Vernon Hills, Ill., and may include the Model Xi series barcode printers (XiIII+, 90XiIII+, 96XiIII+, 110XiIII+140XiIII+, 170XiIII+, 220XiIII+, etc.), the 2800 Series barcode printers, Model Z4M, Z6M, 105SL barcode printers, Model R4 Mplus, R402, R-140 printer/encoders, and others. Further, printers not specifically designed for printing barcodes may also serve for embodiments of the present invention. Barcode printers are used as examples herein because of the specific applicability of the use of XML for communicating with barcode printers and the use of XML stylesheets by barcode printers.

Alternatively, or in addition, the printer 250 may include a "non-printing" mechanism to handle the programming of RFID (radio frequency identification) or like electronic media, which may also receive printed labeling or other printed indicia on its surface. For example, a printer 250 may include an RFID transceiver 261 to operate in conjunction with RFID media or and RFID transponder 182. The term "printer" is meant to include systems that also include RFID read and/or write capability although the "RFID" may not be part of the term. Additionally, although the term "barcode labels" are used herein, this term is not limited to a paper label, and may include, for example, tickets, tags, cards, sheet fed paper, continuous and fanfold paper, plastic media, media embedded with RFID circuits, and other automatic identification devices. The present invention applies to different types of media, just as it applies to different types of printers, and other computing devices, entirely.

Typically, such printers may include various motors, label cutters, ribbon handlers, sensors, and the like, as are shown in the art. Additionally, such printers may include various control inputs or sensors, such as a media sensor, print head temperature sensor, head open sensor, ribbon sensor, and the like, as are known in the art. The printer 250 may include one or more additional processors, other than the processor 228, such as processor 128 residing in the computer system 112. Alternatively, the processor 128 in the computer system 112, if sufficiently powerful, may control and handle the printer 250 functions without the need for a separate processing device in the printer, such as processor 228. Thus, all functions of the printer 250 may be controlled by a computer or processor physically separate from the printer. Greater detail concerning the control of the print-head may be found in U.S. Pat. No. 5,372,439 entitled "Thermal Transfer Printer with Controlled Ribbon Feed," issued Dec. 13, 1994, the content of which is hereby incorporated by reference in its entirety. Typically, however, a printer will include a processor.

The RFID transceiver 261 may be configured to communicate with an RFID transponder 182 and read or program the RFID transponder. RFID transponder 182 may be of the "chip" or "chipless" type, and one common form of such an RFID transponder, which is often used in "smart labels," includes an antenna and an RFID integrated circuit. Such RFID transponders 182 include both DC powered active transponders and battery-less passive transponders, and are available in a variety of form factors. The terms "barcode printer" and "barcode system" are used interchangeably herein with the term "barcode/RFID system," "XML system" and the like, and such a system includes the capability to encode RFID data into an RFID transponder, even though the term "RFID" may not necessarily be part of the identifying text. Greater detail regarding RFID transponders may be found in U.S. application Ser. No. 10/001,364, entitled Method And Apparatus For Associating On Demand Certain Selected Media And Value-Adding Elements, filed Oct. 25, 2001, the content of which is hereby incorporated by reference in its entirety.

A user interface 230 may be included in or coupled to the printer 250 and may include various user input devices 136, such as buttons or switches selectable by the user, a keyboard, a mouse, a touch screen, bar code scanner, RFID reader (or reader/writer), or like user input devices, as are known in the art. The user interface 230 also may include one or more suitable user output devices 140, such as an LCD display, a CRT, various LED indicators, a speech output device, and like data output presentation devices, as are known in the art.

To communicate between the printer 250 and external sources, such as a computer system 112, 112a . . . 112n, a communication interface 242 may be operatively included in or coupled to the printer 250. The communication interface 242 may be, for example, as shown for printer 250, an interface for a direct connection to a computer system 112 or an interface for a connection to a local area network, an Ethernet network, an intranet, or other suitable network 144. A communication interface may also be connected to a public switched telephone network (PSTN) or POTS (plain old telephone system), which may facilitate communication with a network 144 or direct connection to a computer system 112, 112a . . . 1112n or other device. Dedicated and remote networks may also be employed. Any suitable commercially available communication device or network may be used, as is known in the art. As noted above, in addition to a computer system 112, 112a . . . 112n, the communication interface 242 may provide direct or indirect and wired or wireless communication with other devices, such as an external hard drive, a removable memory device, such as a USB flash drive, or other storage device, an RFID tag reader, a barcode scanner, another printer, and other sources of data. Any device in communication with the printer 250 via the communication interface 242 may be a source of incoming data, such as for an incoming XML data stream to the printer 250, including, for example, XML print data stored in a print server, USB flash drive, or other device and transmitted to the printer 250 via the communication interface 242.

Also shown is an enterprise resource planning (ERP) system 188, which may be, for example, a warehouse management system that transmits XML data to the printer 250, either directly or via a network 144. An ERP system 188 may initiate a request to print information, such as barcode labels, or to encode information, such as RFID data. Of course, like computer systems 112, 112a . . . 112n, any enterprise computer system may be used, and this invention is not limited to use with any specific type of enterprise computer system.

The above description related to FIG. 1 showing an exemplary embodiment of a high-level schematic block diagram of a printer 250 according to an embodiment of the present invention helps to recognize that modern computing devices and systems may be configured in any number of ways and involving multiple devices and systems. As such, when various systems may be configured to transmit data to each other in various encoding schemes, it is important that the receiving device be able to identify the encoding scheme of received data and decode the received data according to the paper encoding scheme. This is particularly relevant to non-ASCII transparent encoding schemes. And, as described above, without the proper identification of the encoding scheme, such as in a BOM or other encoding declaration, the receiving device may be unable to property decode the received data or, in the case of streaming data, may even be unable to detect the start of data encoded in a different encoding scheme than the previous data. This problem is specifically applicable to XML data encoded in UTF-16 without a BOM. Embodiments of the present invention solve this problem.

Referring now to FIG. 2, an embodiment of a functional software flow diagram is illustrated. The functions described by each block may be encoded in control logic (software code) stored on a computer-readable and computer-useable medium, thereby creating a computer program product. The functions of FIG. 2 are collectively referred to herein as a detection module, as depicted in FIG. 3 as detection module 330. Although, individual functions may be encoded in separate control logic and/or stored at and on separate computer-readable mediums. The architecture of a detection module is not particular to embodiments of the present invention. The functions may be part of firmware, software, or other control logic, which are collectively referred to in general herein interchangeably as software, functions, and software functions without specificity to the type of computer-readable medium in which the software, function, or software functions are stored in encoded control logic.

The software described below with respect to FIG. 2 may be executed by the processor 228 of the printer 250 of FIG. 1 or, depending upon the relationship between the printer 250 and the computer system 112 of FIG. 1, by the processor 128 of the computer system 112. Again, the processor 128 may perform functions common to both the computer system 112 and the printer 250, if such a relationship exists between the two devices. And there may be one or more processors on either device, which may function in concert or which may function separately. It is not material to the scope of this invention whether the processing or processing functions are performed by the computer system 112 or by the printer 250.

Embodiments of the present invention and the flow diagram of FIG. 2 rely upon two underlying principles. First, there is a limited number of encoding scheme changes that are possible between the data preceding an XML script in an incoming stream of data, also referred to as an incoming XML stream or an incoming XML data stream. Specifically, there are 18 transition cases in all. These 18 transition cases are detailed below. Second, all valid XML scripts, whether well formed or merely valid, must start with an XML declaration that begins with "<?xml".

The following chart identifies the 18 transition cases for a new valid XML script in an incoming stream of data. The transitions are abbreviated with a legend presented below the chart for the encoding schemes and BOMs. For each transition case, the previous encoding scheme, carriage return and line feed (CR/LR), BOM, <?xml declaration start, and new XML encoding scheme are identified. Also, a portion of the corresponding process of the flow diagram of FIG. 2 is identified with respect to the determination of each transition case in accordance with embodiments of the present invention.

| Case | Transition | Previous Encoding State | Character Return/ Line Feed (CR/LF) | BOM | <? | New XML Encoding | FIG. 2 Flow Process |
|---|---|---|---|---|---|---|---|
| a | A-A | ASCII Transparent | 0d0a | | 3c3f | ASCII Transparent | 44-46-48 |
| b | B-B | UTF-16BE | 000d000a | | 003c003f | UTF-16BE | 44-60-62-64 |
| c | L-L | UTF-16LE | 0d000a00 | | 3c003f00 | UTF-16LE | 44-60-80-84 |
| d | A-L | ASCII Transparent | 0d0a | | 3c003f00 | UTF-16LE | 44-60-62-66 |
| e | A-B | ASCII Transparent | 0d0a | | 003c003f | UTF-16BE | 44-60-62-64 |
| f | L-B | UTF-16LE | 0d000a00 | | 003c003f | UTF-16BE | 44-60-80-82 |
| g | L-A | UTF-16LE | 0d000a00 | | 3c3f | ASCII Transparent | 44-46-48 |
| h | B-L | UTF-16BE | 000d000a | | 3c003f00 | UTF-16LE | 44-60-62-66 |
| i | B-A | UTF-16BE | 000d000a | | 3c3f | ASCII Transparent | 44-46-48 |
| j | A-FEFF-B | UTF-16BE | 0d0a | feff | 003c003f | UTF-16BE | 44-60-62-64 |
| k | A-FFFE-L | UTF-16LE | 0d0a | fffe | 3c003f00 | UTF-16LE | 44-60-80-84 |
| l | B-EFBBBF-A | ASCII Transparent | 000d000a | efbbbf | 3c3f | ASCII Transparent | 44-46-48 |
| m | B-FFFE-L | UTF-16LE | 000d000a | fffe | 3c003f00 | UTF-16LE | 44-60-80-84 |
| n | L-FEFF-B | UTF-16BE | 0d000a00 | feff | 003c003f | UTF-16BE | 44-60-62-64 |
| o | L-EFBBBF-A | ASCII Transparent | 0d000a00 | efbbbf | 3c3f | ASCII Transparent | 44-46-48 |
| p | B-FEFF-B | UTF-16BE | 000d000a | feff | 003c003f | UTF-16BE | 44-60-62-64 |
| q | L-FFFE-L | UTF-16LE | 0d000a00 | fffe | 3c003f00 | UTF-16LE | 44-60-80-84 |
| r | A-EFBBBF-A | ASCII Transparent | 0d0a | efbbbf | 3c3f | ASCII Transparent | 44-46-48 |

A = ASCII Transparent
B = UTF-16BE
L = UTF-16LE
FEFF = UTF-16BE BOM
FFFE = UTF-16LE BOM
EFBBBF = UTF-8 BOM By performing a byte level examination of the incoming data stream and looking for the presence and/or absence of a NULL 0x00 byte at key locations, embodiments of the present invention are able to uniquely identify which of the 18 transition cases the current data stream matches. And each of the 18 transition cases may be used to uniquely identify which of the possible encoding schemes are being used (ASCII transparent, UTF 16BE, or UTF-16LE).

Referring again and more specifically to the flow diagram of FIG. 2, a method of auto-detection of an XML encoding scheme is presented and follows the depicted order and decisions of the flow chart. As a precursor to the method, and as described further below with respect to block 92, a method of an embodiment of the present invention may rely upon the knowledge of the current encoding scheme for an incoming data stream. As such, a method may begin or be preceded by storing the current encoding scheme of an incoming data stream such as into a memory that may be called upon, if necessary, during a first pass of the method before block 90, described below, is reached. Storing the current encoding scheme may be performed, such as using a log file or merely maintaining an RAM address with an indication of the current encoding scheme. Further, when the current encoding scheme is ASCII transparent, storing the current encoding scheme may simply require that a previously stored non-ASCII transparent encoding scheme is no longer represented as the current encoding scheme and, for example, the current encoding scheme is determined by default or in real time by the characteristic of the encoding scheme being ASCII transparent. For example, a printer may function in accordance with an embodiment of the present invention by keeping track of the current encoding scheme and using a method of the present invention to detect a change in the current encoding scheme which is then identified as the current encoding scheme to be kept track of by the printer. The manner for storing the current encoding scheme is not particular to embodiments of the present invention.

The method begins as identified by a Start block 10, followed by initializing (creating and/or starting) and clearing a "first in, first out" (FIFO) data buffer and FIFO parser buffer, as shown at block 20. The method continues by receiving data from a communication port, as shown at block 22, and by storing the received data in the data buffer, as shown at block 24. The method then continues by moving (transferring) one byte from the data buffer to the parser buffer, as shown at step 26.

The method then arrives at a first decision point at block 40, where a determination is made regarding whether the current byte in the parser buffer is a 0x3C byte potentially signifying the 0x3C byte for a "<" character of the beginning of an XML script declaration, such as found in "<?xml". For example, in UTF-16BE, a 0x3C byte is found in the two byte sequence 003C, in UTF-16LE, a 0x3C byte is found in the two byte sequence 3C00, and in UTF-8 and other ASCII transparent encoding schemes, a 0x3C byte represents a "<" character. Thus, for ASCII transparent encoding, the presence of a 0x3C byte unambiguously identifies a "<" character. For UTF-16BE encoding, the presence of a 0x3C byte identifies a "<" character if the preceding byte is a NULL 0x00 byte. And for UTF-16LE encoding, the presence of a 0x3C byte identifies a"<" character if the subsequent byte is a NULL 0x00 byte. Until a 0x3C byte is identified, the decision point at block 40 cycles in the "NO" direction back to block 26 that then moves the next byte in the input data stream from the data buffer to the parser buffer.

When a 0x3C byte is identified, the method follows the "YES" direction forward to block 42 in which a subsequent (next or additional) byte in the input data stream is moved from the data buffer to the parser buffer for examination. The method continues to a second decision point at block 44, which separates ASCII transparent encoding schemes from UTF-16 encoding schemes. The second decision point at block 44 makes a determination of whether the current byte in the parser buffer is a NULL 0x00 byte, that is, whether the byte following the 0x3C byte is a NULL 0x00 byte. If the current byte in the parser buffer is not a NULL 0x00 byte, then the method continues in the "NO" direct to block 46, which identifies that the XML data is ASCII transparent. Accordingly, the method continues to block 48, which signifies to use the encoding scheme identified by the XML encoding attribute that may be read from the XML declaration statement. The method then concludes by storing the current encoding scheme, as shown in block 90, for potential future use by the method as described further below, and terminating at the End block 94.

If at the second decision point at block 44, it is determined that the current byte in the parser buffer is a NULL 0x00 byte, then the XML data is not ASCII transparent, but is using an UTF-16 encoding scheme. However, at this point, the byte order (endianness) of the UTF-16 encoding scheme is not yet known and must still be determined. Accordingly, the method continues in the "YES" direction to a third decision point at block 60.

The third decision point at block 60 is a branch based upon the knowledge of the current encoding scheme of the incoming data stream. As noted above, a method of an embodiment of the present invention may rely upon the knowledge of the current encoding scheme for an incoming data stream and does so at the third decision point at block 60. If the XML data is ASCII transparent, then the method does not reach block 60, and knowledge of the current encoding scheme is not required. However, if the XML data is non-ASCII transparent, then the method must know the current encoding scheme for the previous data in the incoming data stream. As such, a method typically will be preceded by storing and/or concurrent with identifying the current encoding scheme of the incoming data stream that may be called upon by the method at the third decision point at block 60. Reference to the "current" encoding scheme of an incoming data stream at the third decision point at block 60 describes the known encoding scheme of data preceding the 0x3C byte identified at block 40, referred to herein as "previous data" in the incoming data stream. By comparison, reference to the "current" encoding scheme of an incoming data stream at block 90 describes the encoding scheme determined by the method and stored in memory for potential future use by the method.

If the previous data in the incoming data stream preceding the 0x3C byte identified at block 40 was not encoded in UTF-16LE, then the endianness of the XML data may be determined by examining the single byte immediately preceding the previously detected 0x3C byte and the method continues in the "NO" direction to block 62 to make this examination and determination of the endianness of the encoding scheme. A fourth decision point at block 62 evaluates the single byte immediately preceding the detected 0x3C byte. A determination is made that if the byte immediately preceding the detected 0x3C byte is a NULL 0x00 byte, then the byte order is big endian and the XML data is encoded using UTF-16BE, as identified at block 64. Otherwise, a determination is made that if the byte immediately preceding the detected 0x3C byte is not a NULL 0x00 byte, then the byte order is little endian and the XML data is encoded using the XML data is encoded using UTF16-LE, as identified at block 66.

If the previous data in the incoming data stream preceding the 0x3C byte identified at block 40 was encoded in UTF-16LE, then the endianness of the XML data may be determined by examining the two bytes immediately preceding the previously detected 0x3C byte and the method continues in the "YES" direction to block 80 to make this examination and determination of the endianness of the encoding scheme. A fifth decision point at block 80 evaluates the two bytes immediately preceding the detected 0x3C byte. A determination is made that if the two bytes immediately preceding the detected 0x3C byte are NULL 0x00 bytes, then the byte order is big endian and the XML data is encoded using UTF16-BE, as identified at block 82. Otherwise, a determination is made that if the two bytes immediately preceding the detected 0x3C byte are not NULL 0x00 bytes, then the byte order is little endian and the XML data is encoded using UTF-16LE, as identified at block 84.

As discussed above, the method may subsequently rely upon the knowledge of the current encoding scheme at the third decision point at block 60. Accordingly, after the identification of the encoding scheme for the XML data, the method perceived at block 90 stores the current encoding scheme, such as in a memory, as shown at element 92.

After an embodiment of the present invention has automatically detected the encoding scheme for the XML data, a proper BOM may be inserted into the incoming data stream so that the XML data is well formed with the inclusion of a BOM and may be parsed using a standard off-the-shelf parser. The data stream including the BOM may be referred to as an enhanced incoming data stream, which, for example, may be passed to another device, such as a printer. For example, it may be useful to add a BOM in situations where a print server or software print driver is used with one or more printers, such as where a device receiving the enhanced incoming data stream uses an off-the-shelf parser that relies upon the presence of BOMs for XML encoded according to a UTF-16 encoding scheme. Also, for example, it may be useful to add a BOM in situations where a printer generates a log or transmits XML data from the printer to another device or system, such as for the other device or system to generate a log or analyze the print data. Such a situation may be present, for example, where a printer reads an RFID tag and combines it with variable data, and a set of XML data is transmitted so an external computer system can correlate the RFID tag with the variable data.

The following description and example is provided to help understand one of the difficulties and non-intuitive aspects of and functions required for automatically determining the encoding scheme, and particularly the endianness of a UTF-16 encoding scheme. In streaming data, where the beginning and end of an XML data string (or file) is not unambiguously known, it is also unknown in UTF-16 encoding if a byte is part of the last character or the beginning of the next character. Thus, unless the current encoding scheme is known for streaming data, the encoding scheme at a transition to a UTF-16 encoding scheme, including the endianness of the encoding scheme, may not be determined. So, for example, if the current encoding scheme is UTF-16BE, then it is sufficient to look at the single byte preceding the 0x3C byte to determine if the new UTF-16 encoding scheme has either a big endian or a little endian byte order. Specifically, if a NULL 0x00 byte precedes the 0x3C byte, then the byte order is big endian, as in 003C. If a NULL 0x00 byte does not precede the 0x3C byte, then the byte order is little endian, as in 3C00. However, if the current encoding scheme is UTF-16LE, then it is not sufficient to simply look at the single byte preceding the 0x3C byte to determine if the new UTF-16 encoding scheme has either a big endian or a little endian byte order, but requires looking at the two bytes preceding the 0x3C byte to determine if the new UTF-16 encoding scheme has either a big endian or a little endian byte order.

This situation is exemplified in the similarities and differences between transition case c for UTF-16LE to UTF-16LE and transition case f for UTF-16LE to UTF-16BE. The CR/LF and <? sequences for these two transition cases are 0d000a00 3c003f00 and 00d000a00 003c003f, respectively. A 0x3C byte is present in both cases and followed by a NULL 0x00 byte. And the 0x3C byte is preceded in both cases by a NULL 0x00 byte. Thus, to determine whether the new UTF-16 encoding scheme following the transition has a big endian or a little endian byte order, the two bytes preceding the 0x3C byte are evaluated. In the transition case c for UTF-16LE to UTF-16LE, the 0x3C byte is preceded by a single NULL 0x00 byte, thus signifying that the 0x3C byte is the first byte of a 3C00 UTF-16LE character. In the transition case f for UTF-16LE to UTF-16BE, the 0x3C byte is preceded by two NULL 0x00 bytes, thus signifying that the 0x3C byte is the second byte of a 003C UTF-16BE character, where the first preceding NULL 0x00 byte is the first byte of a 003C UTF-16BE character and the second preceding NULL 0x00 byte is the second byte of a 0a00 UTF-16LE Line Feed character.

A method according to an embodiment of the present invention may evaluate each byte in an incoming data stream to identify a potential transition case, but the full extent of a method may only be activated when a 0x3C byte is identified. Alternatively, a method according to an embodiment of the present invention may temporarily suspend monitoring the incoming data stream for the presence of a 0x3C byte, such as for periods of time during which no transition and no <?xml declaration statement is anticipated. For example, a method may temporarily suspend monitoring the incoming data stream for the presence of a 0x3C byte while monitoring the XML data of the incoming data stream for an XML syntax error. Upon the detection of an XML syntax error, the method may resume monitoring the incoming data stream for the presence of a 0x3C byte. Similarly, for example, a method may temporarily suspend monitoring the incoming data stream for the presence of a 0x3C byte while monitoring the XML data of the incoming data stream for a closing XML declaration end tag. Upon the detection of a closing XML declaration end tag, the method may resume monitoring the incoming data stream for the presence of a 0x3C byte.

As another exemplary embodiment of the present invention, a print server may be employed to automatically detect and determine UTF-16 encoding schemes and endiannesss thereof in one or more incoming XML data steams for XML declarations without a UTF-16 byte-order mark (BOM) or encoding declaration. Upon detection and determination of a UTF-16 encoding scheme and endiannesss thereof, the print server may insert an appropriate BOM and further transmit the one or more incoming XML data streams to one or more printers. This allows for a single device, the print server, to perform the processing necessary to detect and determine UTF-16 encoding schemes and endiannesss thereof in one or more incoming XML data steams for XML declarations without a UTF-16 byte-order mark (BOM) or encoding declaration, thereby allowing subsequent downstream devices to be able to rely upon BOMs in now well-formed XML statements in the XML data stream.

Similarly, as another exemplary embodiment of the present invention, a proprietary software print driver may be used to perform the processing necessary to detect and determine UTF-16 encoding schemes and endiannesss thereof in one or more incoming XML data steams for XML declarations without a UTF-16 byte-order mark (BOM) or encoding declaration, thereby allowing subsequent downstream devices, such as a printer, to be able to rely upon BOMs in now well-formed XML statements in the XML data stream.

In like manner, any electronic device that operates between one or more sources of data and one or more other devices may be included in another exemplary embodiment of the present invention used to perform the processing necessary to detect and determine UTF-16 encoding schemes and endiannesss thereof in one or more incoming XML data steams to the electronic device for XML declarations without a UTF-16 byte-order mark (BOM) or encoding declaration. For example, a bar code scanner or RFID tag reader may receive and identify data or XML data encoded on or in other objects such as bar codes or RFID tags, respectively. And the bar code scanner or RFID tag reader, or software associated with the bar code scanner or RFID tag reader, transmits the received data as XML data or as part of XML data or transmits the received XML data to another device. Accordingly, the bar code scanner or RFID tag reader, or software associated with the bar code scanner or RFID tag reader, may operate, like a print server might, to automatically determine a UTF-16 encoding scheme in the incoming data stream to the bar code scanner or RFID tag reader without a byte-order mark. And, thus, upon detection and determination of a UTF-16 encoding scheme and endiannesss thereof, the bar code scanner or RFID tag reader may insert an appropriate BOM and further transmit the XML data to one or more other devices.

The printer, system, method, and computer program product embodiments of the present invention are primarily described above in conjunction with printers and printing applications. However, as described above, system, method, and computer program product embodiments of the present invention may be utilized in conjunction with a variety of other applications. For example, system, method, and computer program product of embodiments of the present invention may be utilized in conjunction with wireline and/or wireless networking (e.g., Internet) applications.

Referring now to FIG. 3, a block diagram of an entity that may benefit from the present invention is shown. Although shown as separate entities, as described above, in some embodiments, one or more entities may support one or more of a printer and/or computing system, logically separated but co-located within the entity (or entities). For example, a single entity may support a logically separate, but co-located, computing system and printer. Similarly, one or more entities may support one or more of a printer and/or computing system, logically separated but not co-located within the same entity (or entities).

The entity of FIG. 3 includes various means for performing one or more functions in accordance with exemplary embodiments of the present invention, including those more particularly shown and described herein. It should be understood, however, that an entity may include alternative means for performing one or more of the functions or like functions in accordance with an embodiment of the present invention, without departing from the spirit and scope of the present invention. More particularly, for example, as shown in FIG. 3, the entity can include a processor, controller, or like processing element 328 connected to a memory 326. One or more processors may be used in common as part of the same platform, or processors may be distributed between subsystems. The memory can comprise volatile memory 314 and/or non-volatile memory 318, and typically stores content, data, or the like. For example, the memory 326 typically stores XML data transmitted from and/or received by the entity and may also store an identification of the current encoding scheme of an incoming data stream. Also for example, the memory 326 typically stores computer program code, such as for firmware, software print drivers, operating systems, and client applications, for the processor to perform steps associated with operation of the entity in accordance with embodiments of the present invention. Memory 326 may be, for example, read only memory (ROM), random access memory (RAM), cache memory, a flash drive, a hard drive, and/or other fixed data memory or storage device, such as described above with respect to the computer system 112 of FIG. 1.

As described herein, a detection module 330 or like firmware or other computer program product code logic, may comprise software operated by the respective entities. It should be understood, however, that firmware, software, or computer program products described herein may also comprise one or more hardware elements without departing from the spirit and scope of the present invention. Generally, then, a printer, computing system, or other device or system can include one or more logic elements for performing various functions in accordance with an embodiment of the present invention. As will be appreciated, the logic elements can be embodied in any of a number of different manners. In this regard, the logic elements performing the functions of one or more client applications can be embodied in software code logic and/or an integrated circuit assembly including one or more integrated circuits integral or otherwise in communication with a respective entity (i.e., a printer, computing system, etc.) or more particularly, for example, a processor 328 of the respective entity.

In addition to the memory 326, the processor 328 can also be connected to at least one interface or other means for displaying, transmitting and/or receiving data, content, or the like. In this regard, the interface(s) can include at least one communication interface 342 or other means for transmitting and/or receiving data, content, or the like. For example, the communication interface(s) can include a wireless antenna and communication interface 312, including a transmitter 312 and a receiver 346. Additional communication interfaces, such as for radio frequency (RF) 360, infrared (IR) 362, Bluetooth (BT) 364, Universal Serial Bus (USB) 366, IEEE 1394 (Firewire) 368, and network interface(s) 370, such as for Ethernet or coaxial connections, may also be included. In addition to the communication interface(s), the interface(s) may also include a user input interface 332 that can include one or more devices, such as a microphone, a keypad 333, a touch display, a joystick or other input device 335. The interface(s) may also include a user output interface 334 that can include one or more devices, such as earphones and/or speakers 338 and a display 337.

The entity may also include a detection module 330 connected to the processor 328. As described above, such a module may be software and/or software-hardware components. For example, a detection module 330 may include software and/or software-hardware components capable of receiving an incoming data stream and analyzing the incoming data stream to automatically detect and determine UTF-16 encoding schemes and endiannesss thereof in the incoming data steam for XML declarations without a UTF-16 byte-order mark (BOM) or encoding declaration.

A computer program product for performing one or more functions of embodiments of the present invention may include a computer-readable and computer-useable storage medium, such as the non-volatile storage medium, and software including computer-readable program code logic portions, such as a series of computer instructions, embodied in (stored on) the computer-readable and computer-useable storage medium. Similarly, embodiments of the present invention may be incorporated into hardware and software systems and subsystems, combinations of hardware systems and subsystems and software systems and subsystems, and incorporated into network devices and systems and mobile stations thereof.

In this regard, each block or step of the present invention, such as functions of the schematic block diagrams and the flow chart, and combinations of blocks and steps, can be implemented by various means, such as hardware, firmware, and/or software including one or more computer program instructions. As will be appreciated, any such computer program instructions may be loaded onto a computer or other programmable apparatus (i.e., hardware) to produce a machine, such that the instructions which execute on the computer or other programmable apparatus create means for implementing the functions specified in the blocks and steps. These computer program instructions may also be stored in a computer-readable memory that can direct a computer or other programmable apparatus to function in a particular manner, such that the instructions stored in the computer-readable memory produce an article of manufacture including instruction means which implement the functions specified in the blocks and steps. The computer program instructions may also be loaded onto a computer or other programmable apparatus to cause a series of operational steps to be performed on the computer or other programmable apparatus to produce a computer-implemented process such that the instructions that execute on the computer or other programmable apparatus provide steps for implementing the functions specified in the blocks and steps.

Accordingly, blocks and steps of the schematic block diagrams and flow chart support combinations of means for performing the specified functions, combinations of steps for performing the specified functions, and program instruction means for performing the specified functions. It will also be understood that one or more blocks or steps of the schematic block diagrams and flow chart, and combinations of blocks or steps in the schematic block diagrams and flow chart, can be implemented by special purpose hardware-based computer systems which perform the specified functions or steps, or combinations of special purpose hardware and computer instructions.

As described above and shown in the accompanying figure, printers and other computing devices, systems, methods, and computer program products of embodiments of the present invention that automatically detect and determine UTF-16 encoding schemes and endiannesss thereof in an incoming XML data steam for XML declarations without a UTF-16 byte-order mark (BOM) or encoding declaration are provided. This allows for the automatic and unambiguous accurate detection of UTF-16 encoded XML data within a mixed encoding environment, such as from multiple sources using more than one encoding scheme, even when XML data does not start with a BOM or encoding declaration. As noted above, embodiments of the present invention also allow for using XML in an environment that supports legacy devices and systems that use different Unicode and proprietary encoding schemes and devices and systems that are not XML compliant, i.e., such as devices and systems that are not configured to include a BOM for UTF-16 encoded XML data.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications, equivalents, and other embodiments are intended to be included within the scope of the appended claims.

That which is claimed:

1. A method, comprising automatically determining a UTF-16 encoding scheme, wherein automatically determining a UTF-16 encoding scheme, comprises:
   receiving the incoming data stream;
   storing a current encoding status of the incoming data stream;
   monitoring the incoming data stream for the presence of a 0x3C byte;
   when a 0x3C byte is identified, determining if a byte following the 0x3C byte is a null 0x00 byte; and
   if the byte following the 0x3C byte is a null 0x00 byte and if the current encoding status is not UTF-16LE, then:
      determining if a byte before the 0x3C byte is a null 0x00 byte;
      if the byte before the 0x3C byte is a null 0x00 byte, then begin processing the incoming data stream as UTF-16BE and storing the current encoding status of the incoming data stream as UTF-16BE; and
      if the byte before the 0x3C byte is not a null 0x00 byte, then begin processing the incoming data stream as UTF-16LE and storing the current encoding status of the incoming data stream as UTF-16LE; else,
   if the byte following the 0x3C byte is a null 0x00 byte and if the current encoding status is UTF-16LE, then:
      determining if the two bytes before the 0x3C byte are null 0x00 bytes;
      if the two bytes before the 0x3C byte are null 0x00 bytes, then begin processing the incoming data stream as UTF-16BE and storing the current encoding status of the incoming data stream as UTF-16BE; and
      if the two bytes before the 0x3C byte are not null 0x00 bytes, then begin processing the incoming data stream as UTF-16LE and storing the current encoding status of the incoming data stream as UTF-16LE; else,
   if the byte following the 0x3C byte is not a null 0x00 byte, then using an XML encoding tag determining the current encoding status of the incoming data stream from an encoding scheme identified in the XML encoding tag, begin processing the incoming data stream according to the encoding scheme identified in XML encoding tag, and storing the current encoding status of the incoming data stream as the encoding scheme identified in the XML encoding tag.

2. The method of claim 1, wherein monitoring the incoming data stream for the presence of a 0x3C byte comprises:
   initializing a data buffer and a parser buffer;
   storing data from the incoming data stream in the data buffer;
   transferring data, one byte at a time, from the data buffer to the parser buffer; and
   for each byte of data transferred from the data buffer to the parser buffer, analyzing if the byte represents a 0x3C byte.

3. The method of claim 1, wherein monitoring the incoming data stream for the presence of a 0x3C byte comprises, temporarily suspending monitoring the incoming data stream for the presence of a 0x3C byte while monitoring the XML data of the incoming data stream for an XML syntax error, and upon the detection of which, resuming monitoring the incoming data stream for the presence of a 0x3C byte.

4. The method of claim 1, wherein monitoring the incoming data stream for the presence of a 0x3C byte comprises, temporarily suspending monitoring the incoming data stream for the presence of a 0x3C byte while monitoring the XML data of the incoming data stream for a closing XML declaration end tag, and upon the detection of which, resuming monitoring the incoming data stream for the presence of a 0x3C byte.

5. The method of claim 1, wherein automatically determining a UTF-16 encoding scheme, further comprises inserting a byte-order mark into the incoming data stream identifying the current encoding status of the incoming data stream.

6. A method, comprising automatically determining a UTF-16 encoding scheme, wherein automatically determining a UTF-16 encoding scheme comprises:
  receiving the incoming data stream;
  storing a current encoding status of the incoming data stream;
  monitoring the incoming data stream for the presence of a 0x3C byte;
  when a 0x3C byte is identified, determining if a byte following the 0x3C byte is a null 0x00 byte; and
  if the byte following the 0x3C byte is a null 0x00 byte and if the current encoding status is not UTF-16LE, then:
    determining if a byte before the 0x3C byte is a null 0x00 byte;
    if the byte before the 0x3C byte is a null 0x00 byte, then begin processing the incoming data stream as UTF-16BE and storing the current encoding status of the incoming data stream as UTF-16BE; and
    if the byte before the 0x3C byte is not a null 0x00 byte, then begin processing the incoming data stream as UTF-16LE and storing the current encoding status of the incoming data stream as UTF-16LE; else,
  if the byte following the 0x3C byte is a null 0x00 byte and if the current encoding status is UTF-16LE, then:
    determining if the two bytes before the 0x3C byte are null 0x00 bytes;
    if the two bytes before the 0x3C byte are null 0x00 bytes, then begin processing the incoming data stream as UTF-16BE and storing the current encoding status of the incoming data stream as UTF-16BE; and
    if the two bytes before the 0x3C byte are not null 0x00 bytes, then begin processing the incoming data stream as UTF-16LE and storing the current encoding status of the incoming data stream as UTF-16LE.

7. A computer program product comprising a non-transitory computer-useable medium having control logic stored therein for detecting a current encoding scheme of an incoming data stream without an byte-order mark, the control logic comprising:
  a first code configured for receiving an incoming data stream;
  a second code configured for storing a current encoding status of the incoming data stream;
  a third code configured for monitoring the incoming data stream for the presence of a 0x3C byte;
  a fourth code configured for when a 0x3C byte is identified, determining if a byte following the 0x3C byte is a null 0x00 byte; and
  a fifth code configured for if the byte following the 0x3C byte is a null 0x00 byte and if the current encoding status is not UTF-16LE, then:
    determining if a byte before the 0x3C byte is a null 0x00 byte;
    if the byte before the 0x3C byte is a null 0x00 byte, then begin processing the incoming data stream as UTF-16BE and storing the current encoding status of the incoming data stream as UTF-16BE; and
    if the byte before the 0x3C byte is not a null 0x00 byte, then begin processing the incoming data stream as UTF-16LE and storing the current encoding status of the incoming data stream as UTF-16LE; else,
  a sixth code configured for if the byte following the 0x3C byte is a null 0x00 byte and if the current encoding status is UTF-16LE, then:
    determining if the two bytes before the 0x3C byte are null 0x00 bytes;
    if the two bytes before the 0x3C byte are null 0x00 bytes, then begin processing the incoming data stream as UTF-16BE and storing the current encoding status of the incoming data stream as UTF-16BE; and
    if the two bytes before the 0x3C byte are not null 0x00 bytes, then begin processing the incoming data stream as UTF-16LE and storing the current encoding status of the incoming data stream as UTF-16LE; else,
  a seventh code configured for if the byte following the 0x3C byte is not a null 0x00 byte, then using an XML encoding tag determining the current encoding status of the incoming data stream from an encoding scheme identified in the XML encoding tag, begin processing the incoming data stream according to the encoding scheme identified in the XML encoding tag, and storing the current encoding status of the incoming data stream as the encoding scheme identified in the XML encoding tag.

8. The computer program product of claim 7, further comprising an eighth code configured for inserting a byte-order mark into the incoming data stream identifying the current encoding status of the incoming data stream.

9. A printer, comprising:
  a processor configured for receiving XML data in an incoming data stream;
  a memory configured for storing the XML data of the incoming data stream;
  wherein the processor is further configured for parsing the incoming data stream, byte-by-byte, to determine a change in the encoding scheme of the incoming data stream by:
    storing a current encoding status of the incoming data stream in the memory;
    monitoring the parsed bytes of the incoming data stream for the presence of a 0x3C byte;
    when a 0x3C byte is identified, determining if a byte following the 0x3C byte is a null 0x00 byte; and
    if the byte following the 0x3C byte is a null 0x00 byte and if the current encoding status is not UTF-16LE, then:
      determining if a byte before the 0x3C byte is a null 0x00 byte;
      if the byte before the 0x3C byte is a null 0x00 byte, then begin processing the incoming data stream as UTF-16BE and storing the current encoding status of the incoming data stream as UTF-16BE; and
      if the byte before the 0x3C byte is not a null 0x00 byte, then begin processing the incoming data stream as UTF-16LE and storing the current encoding status of the incoming data stream as UTF-16LE; else,
    if the byte following the 0x3C byte is a null 0x00 byte and if the current encoding status is UTF-16LE, then:
      determining if the two bytes before the 0x3C byte are null 0x00 bytes;
      if the two bytes before the 0x3C byte are null 0x00 bytes, then begin processing the incoming data stream as UTF-16BE and storing the current encoding status of the incoming data stream as UTF-16BE; and if the two bytes before the 0x3C byte are not null 0x00 bytes, then begin processing the incoming data stream as UTF-16LE and storing the current encoding status of the incoming data stream as UTF-16LE; else, if the byte following the 0x3C byte is not a null 0x00 byte, then using an XML encoding tag determining the current encoding status of the incoming data stream from an encoding scheme identified in the XML encoding tag, begin processing the incoming data stream according to the encoding scheme identified in the XML encoding tag, and storing the current encoding status of the incoming data stream as the encoding scheme identified in the XML encoding tag.

10. The printer of claim 9, wherein the processor is further configured for receiving structure markup language data in the incoming data stream from multiple sources.

11. A printing system, comprising:
a first electronic device; and
a printer communicatively connected to the first electronic device and configured to receive data from the first electronic device in an incoming data stream received by the printer, wherein the printer comprises an XML processor configured to process the incoming data stream to determine a change in the encoding scheme of the incoming data stream by:
storing a current encoding status of the incoming data stream;
monitoring the incoming data stream for the presence of a 0x3C byte;
when a 0x3C byte is identified, determining if a byte following the 0x3C byte is a null 0x00 byte; and
if the byte following the 0x3C byte is a null 0x00 byte and if the current encoding status is not UTF-16LE, then:
determining if a byte before the 0x3C byte is a null 0x00 byte;
if the byte before the 0x3C byte is a null 0x00 byte, then begin processing the incoming data stream as UTF-16BE and storing the current encoding status of the incoming data stream as UTF-16BE; and
if the byte before the 0x3C byte is not a null 0x00 byte, then begin processing the incoming data stream as UTF-16LE and storing the current encoding status of the incoming data stream as UTF-16LE; else, if the byte following the 0x3C byte is a null 0x00 byte and if the current encoding status is UTF-16LE, then:
determining if the two bytes before the 0x3C byte are null 0x00 bytes;
if the two bytes before the 0x3C byte are null 0x00 bytes, then begin processing the incoming data stream as UTF-16BE and storing the current encoding status of the incoming data stream as UTF-16BE; and
if the two bytes before the 0x3C byte are not null 0x00 bytes, then begin processing the incoming data stream as UTF-16LE and storing the current encoding status of the incoming data stream as UTF-16LE; else, if the byte following the 0x3C byte is not a null 0x00 byte, then using an XML encoding tag determining the current encoding status of the incoming data stream from an encoding scheme identified in the XML encoding tag, begin processing the incoming data stream according to the encoding scheme identified in the XML encoding tag, and storing the current encoding status of the incoming data stream as the encoding scheme identified in the XML encoding tag.

12. The printing system according to claim 11, further comprising a second electronic device communicatively connected to the printer and configured to transmit data to the printer, received from the second electronic device by the printer in the incoming data stream in an encoding scheme different from the encoding scheme of data of the first electronic device.

13. The printing system according to claim 12, wherein at least one of the first electronic device and the second electronic device is configured to transmit data to the printer according to a UTF-16 encoding scheme without including a byte-order mark.

14. The printing system according to claim 11, wherein the first electronic device is configured to transmit data to the printer in at least two different encoding schemes.

15. The printing system according to claim 14, wherein the first electronic device is configured to transmit data to the printer according to a UTF-16 encoding scheme without including a byte-order mark.

* * * * *